UNITED STATES PATENT OFFICE.

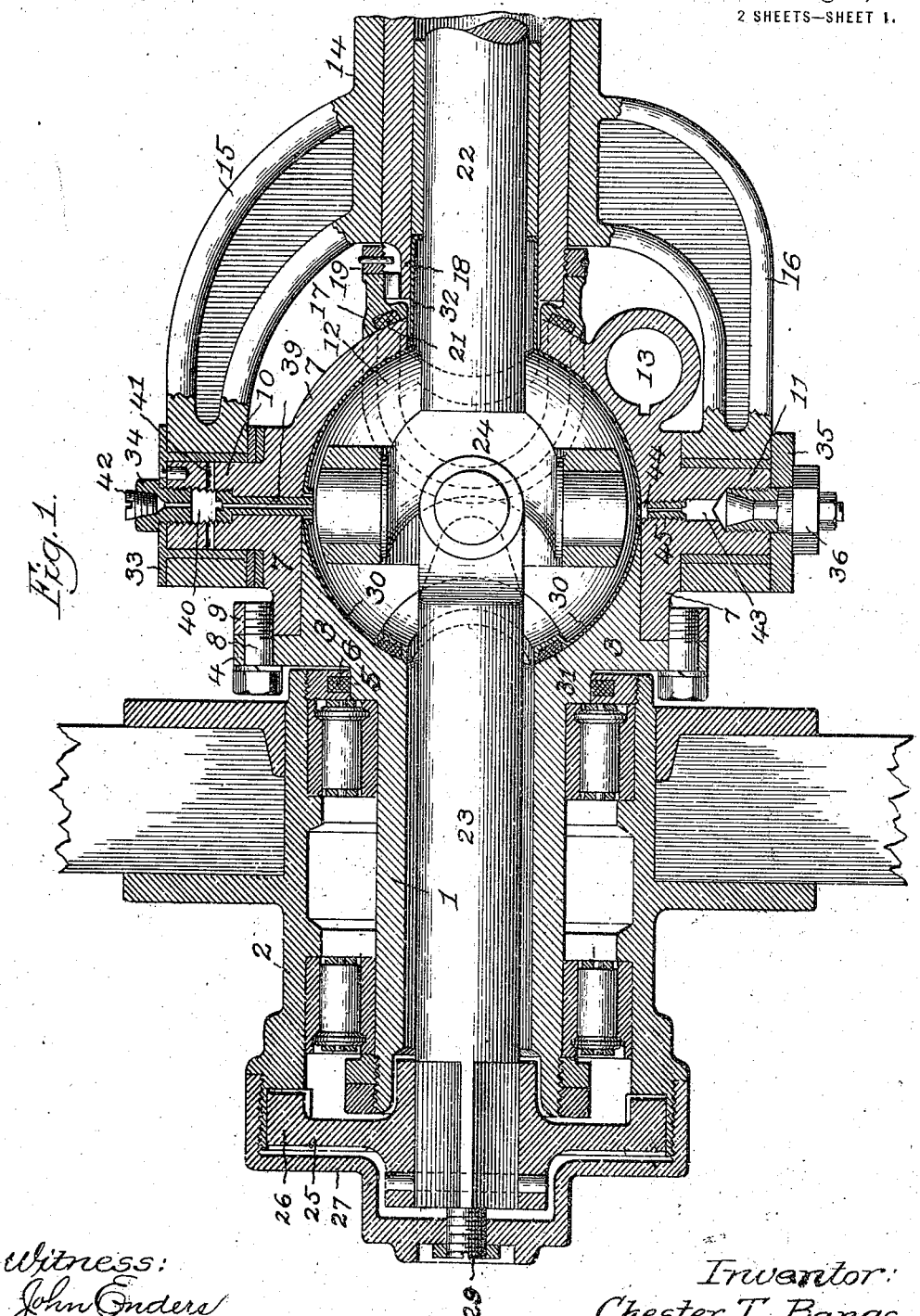

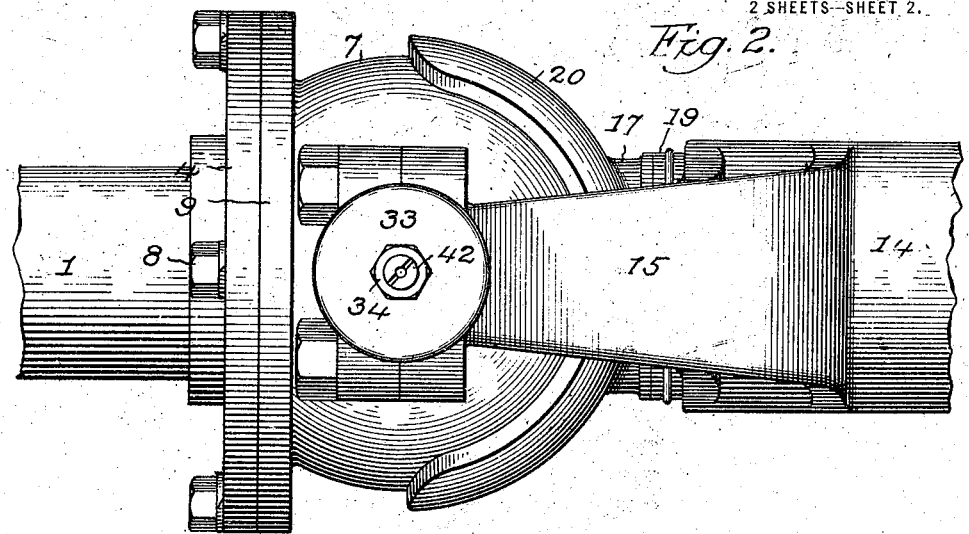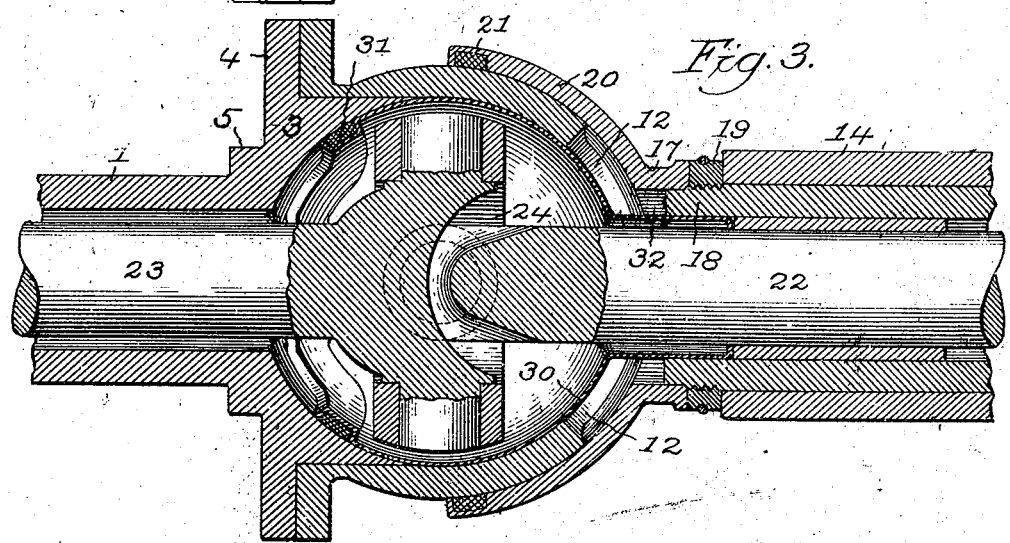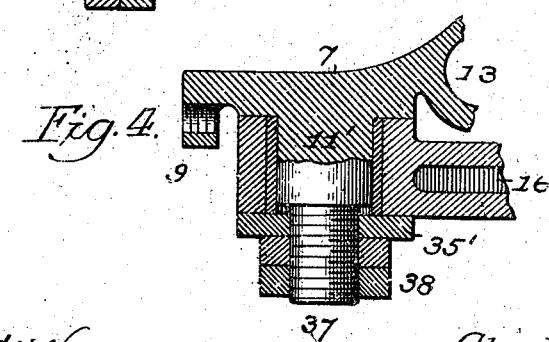

CHESTER T. BANGS, OF HOBART, INDIANA.

TRACTION-WHEEL.

1,274,840.   Specification of Letters Patent.   Patented Aug. 6, 1918.

Application filed April 7, 1917. Serial No. 160,406.

*To all whom it may concern:*

Be it known that I, CHESTER T. BANGS, a citizen of the United States of America, and a resident of Hobart, in the county of Lake, State of Indiana, have invented certain new and useful Improvements in Traction-Wheels, of which the following is a specification.

This invention relates to that class of traction wheels for motor driven vehicles involving a construction adapting the same for combined driving and steering purposes, an example of which is shown in my prior Patent No. 926,313, dated June 29, 1909. And the present improvement has for its various objects:—

To provide a structural formation and association of parts in which a globular lubricant containing shell or head on the axle skein or arbor of the wheel, incloses the universal coupling of the associated sectional drive shaft, to house and maintain the said coupling in a properly lubricated condition, with an avoidance of leakage, and with which a substantial journaling means for an end yoke portion of the axle housing of the vehicle, on the shell or head aforesaid, is provided.

To provide in connection with the above mentioned shell or head, a readily removable means for holding a supply of lubricant, and preventing leakage of the lubricant at the joints and openings necessary in said shell or head.

To provide means for the proper initial assemblage of the parts in proper operative relation, and a maintenance of such relation and compensation for wear due to extended use.

To provide a convenient means for the introduction of a supply lubricant to the interior of the shell or head above referred to and its contained mechanisms, and to the journal trunnions of said shell or head.

To provide means for the convenient withdrawal of the used lubricant from the said shell or head. All as will hereinafter more fully appear.

In the accompanying drawings:—

Figure 1, is a longitudinal sectional elevation illustrating the general structure and association of parts in the present invention.

Fig. 2, is a detail plan of the same.

Fig 3 is a detail horizontal section.

Fig. 4 is a fragmentary longitudinal section of a modified form of the lower journal connection of the globular shell or head and the associated yoke member of the present structure.

Similar reference numerals indicate like parts in the several views.

Referring to the drawings, 1 designates the tubular skein or arbor upon which is revolubly mounted the hub member 2 of a traction wheel in any usual and suitable manner. In the present structure, the inner end of said tubular skein or arbor 1 is formed with an enlarged head 3 having a concave inner face and a cylindrical perimeter as shown. Said enlarged head 3 is also provided with a peripheral attaching flange 4 and with an annular offset bearing shoulder or step 5 having coöperation with a packing ring or gland 6 carried by the hub 2 of the traction wheel, and adapted to prevent leakage at such point of lubricant from the bearings of the present mechanism.

7 designates a head or shell formed with a semi-globular cavity, the wall of which extends outwardly in the form of a cylindrical bore adapted to fit the aforesaid cylindrical perimeter of the enlarged head 3, and be secured thereon and thereto by connecting bolts 8 passing a flange 9 on the head 7 and through the flange 4 of the enlarged head 3 aforesaid, as shown.

10 and 11 designate upper and lower trunnions integrally formed on the head or shell 7, in axial alinement with each other and adapted for journal engagement in the upper and lower jaws of an end yoke on the main axle frame or housing hereinafter described.

12 designates a horizontally elongated orifice formed in the inner end of the head or shell, 7, and adapted to permit of the pivotal movements in a horizontal plane of said head or shell 7 in relation to the driving shaft section hereinafter described.

13 designates an orificed ear or lug on one side of the head or shell 7 for the attachment of one end of the steering mechanism of the vehicle.

14 designates an end portion of the stationary axle frame or housing of the vehicle. Said end portion is of the usual yoke form having upper and lower pivot jaws 15, 16, formed with alined orifices which provide journal bearings for the aforesaid upper and lower trunnions 10, 11 of the head or shell 7. Each of said jaws 15, 16, are of the usual two-part formation, shown in Fig. 2, to permit of assemblage of the parts.

17 designates a gland member having an annular hub portion slidingly fitting an annular rim portion 18 of the axle frame 14, and adjustable thereon by a screw-sleeve 19, as shown in Fig. 1. In the present improvement said hub portion of the gland member 17 is formed with a pair of integral curved wings 20, arranged in a horizontal plane and adapted to closely fit the globular surface of the head or shell 7 to prevent leakage of the lubricant through the elongated orifice 12 of said head or shell 7. And to such end the bearing face of said wings 20 will be formed with a packing containing recess 21 near the outer margin of said face with a view to a more perfect retention of the lubricant.

22, 23, designate the respective driving and driven shaft sections of the driving means of the wheel, arranged in alined relation, and with their adjacent ends connected together by a universal coupling 24 of a usual and suitable form. Said coupling 24 is positioned in the structure so that the axes of its different pivot pins are on a plane common to the axes of the trunnions 10, 11, aforesaid, and are adjusted to, and maintained in such position by means hereinafter described.

The aforesaid driving shaft section 22 has the usual bearing in an internal journal bushing of the axle housing 14, while the aforesaid driven shaft section 23 extends through the axial bore of the axle skein or arbor 1, and at its outer end is provided with a fixed head 25, the perimeter of which is formed with projections or lugs 26, for operative engagement with complementary recesses in the interior of the outer end of the wheel hub 2, in manner substantially similar to that described and claimed in my aforesaid prior Patent No. 926,313 and as in said patented construction, said connection is covered by the usual hub cap 27, as shown.

In the present improvement material features in the above described hub and shaft connection consists as follows:

29 designates an axially arranged abutment screw, screwing through the hub cap 27 aforesaid, and adapted to effect a longitudinal adjustment of the driven shaft section 23 and the associated universal coupling 24 into the before described relation to the trunnions 10, 11, aforesaid, as the parts become worn by continued use, as well as in an initial assemblage of the parts.

30 designates a globular holding shell or vessel for the lubricant, adapted to closely fit the globular cavity of the fixedly associated enlarged head 3 and head or shell 7 aforesaid, and provided with diametrically opposite orifices corresponding with the bore of the axle skein or arbor 1, and with the horizontally elongated orifice 12 of the head or shell 7, respectively, the first mentioned orifice being of a horizontally elongated form to permit of the required pivotal movement of the shell 30 in a horizontal plane in actual use.

31 designates a packing recess or gland at the margin of the elongated orifice, just described, and adapted to prevent leakage of lubricant from the interior of the shell 30 at such point.

32 designates a cylindrical neck or extension on the holding shell 30 aforesaid, formed to fit the bore of the annular rim portion 18 of the fixed axle frame or housing 14 aforesaid, to aid in maintaining the holding shell 30 in proper position, and by its extension past the joint or seam between the gland member 17 and the rim portion 18 aforesaid, prevent any leakage of lubricant at such point.

33 designates a bearing collar adjustably attached to the outer end of the upper trunnion 10, by a headed screw 34, preferably of the tubular type shown and for the purpose hereinafter stated. Said collar 33 is adapted to have bearing upon the top surface of the upper jaw 15 of the yoke of the axle housing 14 aforesaid, to assist in maintaining the trunnions 10, 11 in proper position, and resist vertical downward thrusts in actual use.

35 designates a bearing collar adjustably attached to the outer end of the lower trunnion 11, by a headed screw 36, adapted to have bearing upon the under surface of the lower jaw 16, of the yoke of the axle housing 15 aforesaid, to coöperate with the collar 33 aforesaid, in maintaining the trunnions 10, 11, in proper position, and resist vertical thrusts thereon in actual use. The headed screw 36 aforesaid, is preferably of the expansion lock type shown, so as to be capable of being locked at its desired adjustment.

In the modified structure shown in Fig. 4, the lower trunnion 11' is provided with a screw-threaded extension 37, which passes through a collar 35, similar in arrangement to the collar 35 above described. Said extension 37 receives a pair of locking nuts 38 adapted to draw said trunnion 11' in a downward direction, and resist any vertical stresses tending to move said trunnion and associated parts either upwardly or downwardly.

39 designates a headed screw-threaded tubular stem fitting an axial bore in the upper trunnion 10 aforesaid, and adapted to project through the wall of the head or shell 7, and have engagement in an orifice of the holding shell 30 to hold the same in proper relation to its associated parts. The bore of the stem 39 provides a conduit for a supply of lubricant to the interior of the holding shell 30.

The outer portion 40 of the aforesaid axial bore of the trunnion 10, is enlarged to receive the head of the stem 39 aforesaid, and is provided with a series of radial passages 41 for conducting lubricant to the bearing surface of said trunnion 10.

The headed tubular adjusting screw 34, above described, has engagement in the outer part of said enlarged portion 40 of the bore in the trunnion 10, with the bore of said screw 34 adapted to conduct the lubricant into said enlarged portion 40 of said bore.

42 designates a screw-plug fitting the bore of the screw 34 and adapted to close said bore after the introduction of the lubricant.

43 designates an axial bore in the lower trunnion 11, adapted to register with an orifice in the lower part of the globular shell 30, to permit of a drainage of the lubricant therefrom.

44 designates a closure disk adapted to close said drainage opening or passage, and held in place by a screw-threaded plug 45 screwing into a correspondingly screw-threaded portion of the aforesaid axial bore 43 of the trunnion 11, as shown in Fig. 1.

Having thus fully described my said invention, what I claim as new and desire to secure by Letters Patent, is:—

1. In a combined steering and traction wheel of the class wherein the carrying arbor of the wheel has at one end a hollow globular shape casing inclosing the universal coupling of the sectional driving shaft of the wheel, which casing carries the upper and lower trunnions having pivotal connection with vertically spaced pivot jaws on a fixed axle frame, the said inclosing casing having an enlarged head formed with a concave inner face, a marginal attaching flange and a circular bearing portion extending away from said flange, and a semi-globular sub-casing having a circular bore fitting the circular portion of the enlarged head aforesaid, a marginal flange for attachment to the flange of said head, and the upper and lower trunnions aforesaid, substantially as set forth.

2. In a combined steering and traction wheel of the class wherein the carrying arbor of the wheel has at one end a hollow globular shape casing inclosing the universal coupling of the sectional driving shaft of the wheel, which casing carries the upper and lower trunnions having pivotal connection with vertically spaced pivot jaws on a fixed axle frame, the combination with said inclosing casing formed with a horizontally elongated orifice for relative independent movement of one section of the driving shaft, of a gland member carried by the axle frame aforesaid and having curved wings the inner marginal surfaces of which are formed with a holding recess for a packing adapted for bearing on the outer surface of the inclosing casing adjacent to the horizontal orifice thereof, substantially as set forth.

3. In a combined steering and traction wheel of the class wherein the carrying arbor of the wheel has at one end a hollow globular shape casing inclosing the universal coupling of the sectional driving shaft of the wheel, which casing carries the upper and lower trunnions having pivotal connection with vertically spaced pivot jaws on a fixed axle frame, the combination with said inclosing casing formed with a horizontally elongated orifice for relative independent movement of one section of the driving shaft, of a gland member adjustably attached to the axle frame aforesaid and having curved wings for bearing upon the outer surface of said inclosing casing adjacent to the horizontal orifice thereof, and means for adjusting said gland member toward said casing, substantially as set forth.

4. In a combined steering and traction wheel of the class wherein the carrying arbor of the wheel has at one end a hollow globular shape casing inclosing the universal coupling of the sectional driving shaft of the wheel, which casing carries the upper and lower trunnions having pivotal connection with vertically spaced pivot jaws on a fixed axle frame, the combination with said inclosing casing formed with a horizontally elongated orifice for relative independent movement of one section of the driving shaft, of a lubricant containing shell supportingly associated with the axle frame and fitting the inner surface of the inclosing casing and adapted to cover the leakage joints thereof, substantially as set forth.

5. In a combined steering and traction wheel of the class wherein the carrying arbor of the wheel has at one end a hollow globular shape casing inclosing the universal coupling of the sectional driving shaft of the wheel, which casing carries the upper and lower trunnions having pivotal connection with vertically spaced pivot jaws on a fixed axle frame, the combination with said inclosing casing formed with a horizontally elongated orifice for relative independent movement of one section of the driving shaft, of a lubricant containing shell of a globular form supportingly associated with the axle frame and fitting the inner surface of the inclosing casing and adapted to cover the leakage joints thereof, substantially as set forth.

6. In a combined steering and traction wheel of the class wherein the carrying arbor of the wheel has at one end a hollow globular shape casing inclosing the universal coupling of the sectional driving shaft of the wheel, which casing carries the upper and lower trunnions having pivotal connection with vertically spaced pivot jaws on a fixed axle frame, the combination with said inclosing casing formed with a horizontally elongated orifice for relative independent movement of one section of the driving shaft, of a lubricant containing shell fitting the inner surface of the inclosing casing and having at one end an annular neck adapted for supporting engagement with the axle frame and at the other end an orifice and external holding recess for a packing, substantially as set forth.

7. In a combined steering and traction wheel of the class wherein the carrying arbor of the wheel has at one end a hollow globular shape casing inclosing the universal coupling of the sectional driving shaft of the wheel, which casing carries the upper and lower trunnions having pivotal connection with vertically spaced pivot jaws on a fixed axle frame, the combination with said inclosing casing formed with a horizontally elongated orifice for relative independent movement of one section of the driving shaft, of a lubricant containing shell of a globular form supportingly associated with the axle frame and fitting the inner surface of the inclosing casing, and a tubular stem fitting an axial passage in the upper trunnion aforesaid, the lower end of said stem having holding engagement with the lubricant containing shell aforesaid, substantially as set forth.

8. In a combined steering and traction wheel of the class wherein the carrying arbor of the wheel has at one end a hollow globular shape casing inclosing the universal coupling of the sectional driving shaft of the wheel, which casing carries the upper and lower trunnions having pivotal connection with vertically spaced pivot jaws on a fixed axle frame, the combination with said inclosing casing formed with a horizontally elongated orifice for relative independent movement of one section of the driving axle, of a lubricant containing shell of a globular form supportingly associated with the axle frame and fitting the inner surface of the inclosing casing, the lower trunnion aforesaid having an axial passage alined with an outlet orifice from the lubricant containing shell aforesaid, and means for closing said passage, substantially as set forth.

Signed at Chicago, Illinois, this 27th day of March, 1917.

CHESTER T. BANGS.